(12) United States Patent
Sun et al.

(10) Patent No.: US 10,996,361 B2
(45) Date of Patent: May 4, 2021

(54) ADAPTIVE RECEIVER DEGHOSTING FOR SEISMIC STREAMER

(71) Applicant: Saudi Arabian Oil Company, Dhahran (SA)

(72) Inventors: Yimin Sun, Delft (NL); Dirk Jacob Verschuur, Delft (NL); Roald van Borselen, Voorschoten (NL)

(73) Assignee: Saudi Arabian Oil Company, Dhahran (SA)

(*) Notice: Subject to any disclaimer, the term of this patent is extended or adjusted under 35 U.S.C. 154(b) by 454 days.

(21) Appl. No.: 16/125,346

(22) Filed: Sep. 7, 2018

(65) Prior Publication Data

US 2020/0081146 A1 Mar. 12, 2020

(51) Int. Cl.
*G01V 1/36* (2006.01)

(52) U.S. Cl.
CPC ...... *G01V 1/364* (2013.01); *G01V 2210/1423* (2013.01); *G01V 2210/43* (2013.01); *G01V 2210/56* (2013.01)

(58) Field of Classification Search
CPC ........... G01V 1/364; G01V 2210/1423; G01V 2210/43; G01V 2210/56; G01V 1/50; G01V 1/38
See application file for complete search history.

(56) References Cited

U.S. PATENT DOCUMENTS

| 8,699,297 B2 | 4/2014 | Ozdemir et al. |
| 9,081,111 B2 | 7/2015 | Amundsen et al. |
| 2013/0163379 A1 | 6/2013 | Poole |

(Continued)

FOREIGN PATENT DOCUMENTS

| CN | 101581223 | 11/2009 |
| WO | 2010044918 | 4/2010 |

(Continued)

OTHER PUBLICATIONS

Gulf Cooperation Council Examination Report issued in GCC Application No. GC 2017-33108 dated Jan. 14, 2019, 4 pages.

(Continued)

*Primary Examiner* — Daniel Pihulic
(74) *Attorney, Agent, or Firm* — Fish & Richardson P.C.

(57) ABSTRACT

Methods, systems, and apparatus, including computer programs encoded on a computer storage medium, for generating receiver deghosted output according to a receiver deghosting model. In one aspect, a method includes receiving an offshore seismic dataset of a surveyed subsurface that includes a seismic wavefield and is collected by receivers that comprise a streamer that is deployed relative to a water surface; determining an initial plane value for the water surface reflectivity and an initial location value for a position of the streamer; generating a receiver deghosting model by backward and forward propagating the seismic wavefield at the water surface to streamer locations, the receiver deghosting model including tuning parameters; adjusting the tuning parameters according to an adaptive target residue and an inversion target residue; generating receiver deghosted output according to the tuned receiver deghosting model; and determining a productivity of the surveyed subsurface based on the receiver deghosted output.

20 Claims, 9 Drawing Sheets

(56) References Cited

U.S. PATENT DOCUMENTS

| | | | |
|---|---|---|---|
| 2014/0016436 | A1 | 1/2014 | Sollner et al. |
| 2014/0022860 | A1 | 1/2014 | van Borselen et al. |
| 2014/0200812 | A1 | 7/2014 | Kitchenside |
| 2014/0301158 | A1 | 10/2014 | Zhang et al. |
| 2014/0365135 | A1 | 12/2014 | Poole |
| 2015/0212222 | A1 | 6/2015 | Poole |
| 2015/0301209 | A1 | 10/2015 | Yarman et al. |
| 2017/0097432 | A1 | 4/2017 | Poole |
| 2018/0003842 | A1 | 1/2018 | Coates et al. |
| 2020/0081146 | A1* | 3/2020 | Sun .................... G01V 1/38 |

FOREIGN PATENT DOCUMENTS

| | | | |
|---|---|---|---|
| WO | 2014179282 | | 11/2014 |
| WO | 2016038458 | | 3/2016 |
| WO | 2017065632 | | 4/2017 |
| WO | WO-2020051313 A1 * | 3/2020 | ............... G01V 1/50 |

OTHER PUBLICATIONS

Sun and Verschuur, "Three-dimensional receiver deghosting of seismic streamer data using L1 inversion and redundant extended radon dictionary," Geophysical Prospecting, 2018, 17 pages.

Gulf Cooperation Council Examination Report issued in GCC Application No. GC 2017-33108 dated Dec. 29, 2019, 3 pages.

Poole "Pre-Migration Receiver De-Ghosting and Re-Datuming for Variable Depth Streamer Data," 2013 SEG Annual Meeting, Houston, pp. 4216-4220, Aug. 19, 2013, 5 pages.

TRAD, "Latest Views of the Sparse Radon Transform," Geophysics, vol. 68, No. 1, Jan.-Feb. 2003, pp. 386-399.

Hennenfent, "Sampling and Reconstruction of Seismic Wavefields in the Curvelet Domain"; University of British Columbia; Apr. 1, 2008; 153 pages.

International Search Report and Written Opinion of the International Searching Authority issued in International Application No. PCT/US2017/023787 dated Jun. 27, 2017; 13 pages.

International Search Report and Written Opinion in International Application No. PCT/US2019/049719 dated Nov. 20, 2019, 16 pages.

Vrolijk et al., "Shot-based deghosting for variable sea surface and receiver depth," SEG Technical Program Expanded Abstracts 2017, Aug. 17, 2017, 6 pages.

Vrolijk et al., "Integrated receiver deghosting and closed-loop surface-multiple elimination," Geophysics, vol. 82, No. 4, Apr. 12, 2017, 9 pages.

Chinese Office Action in Chinese Appln. No. 201780031733.3, dated Mar. 27, 2020, 15 pages, English translation.

GCC Examination Report in GCC Appln. No. GC 2017-33108, dated May 10, 2020, 3 pages.

GCC Examination Report in GCC Appln. No. GC 2019-38251, dated Sep. 18, 2020, 5 pages.

* cited by examiner

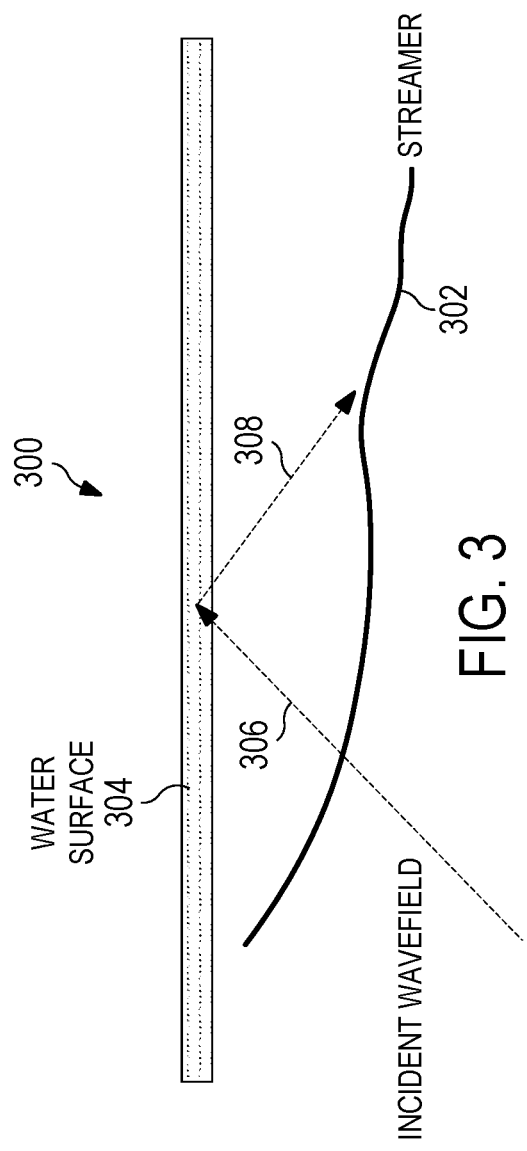

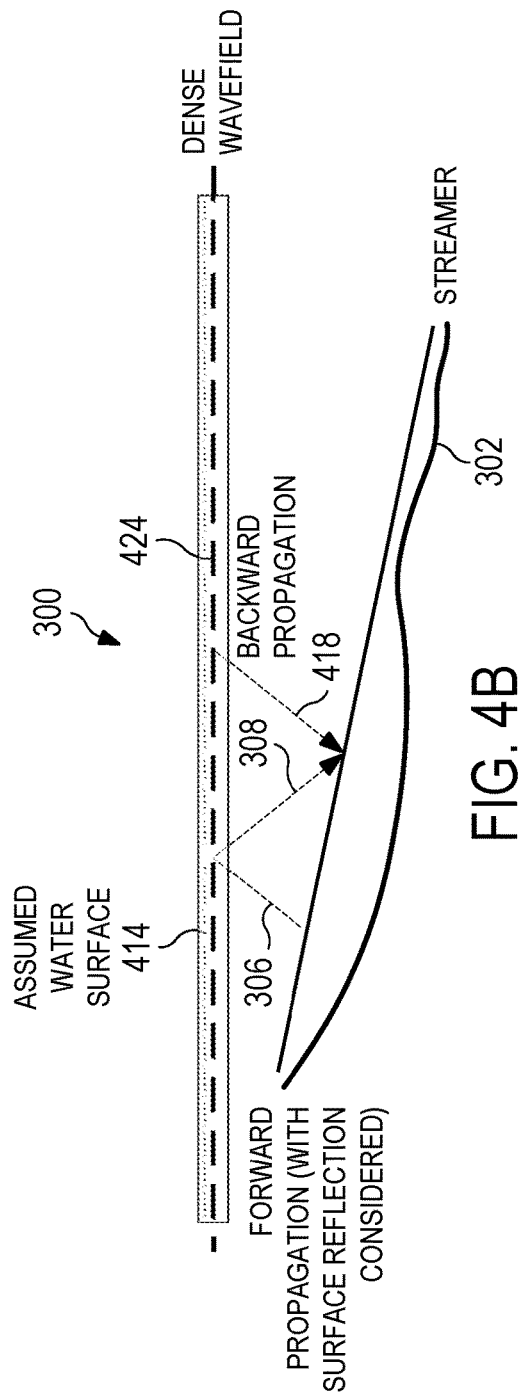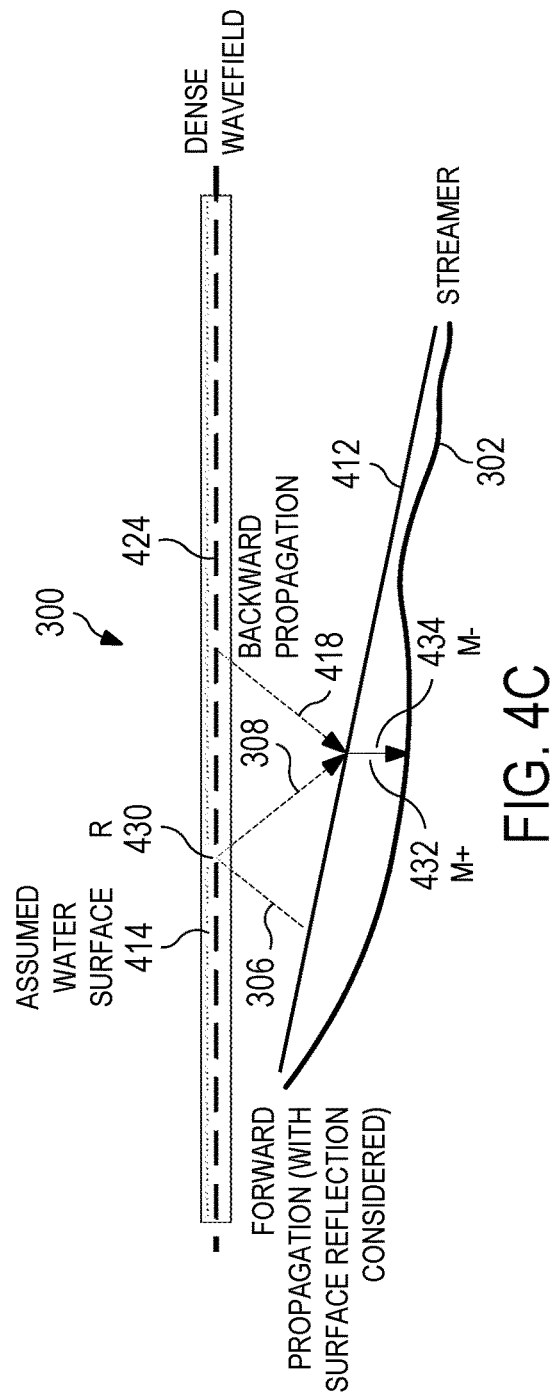

ADAPTIVE RECEIVER DEGHOSTING FOR SEISMIC STREAMER

TECHNICAL FIELD

This disclosure relates to methods, systems, and apparatus for improving the exploration for hydrocarbons under a body of water.

BACKGROUND

In the exploration for hydrocarbons, geophysical structures under the bed of a body of water can be mapped through a marine seismic survey that includes recording and processing seismic data. For example, recorded seismic data may include pressure or particle motion related data regarding the propagation of seismic waves through the earth. An image or model depicting the various layers that form the surveyed subsurface may be generated based on this recorded seismic data. This imaging information is useful in determining the presence of reservoirs of various hydrocarbons.

SUMMARY

The present disclosure describes methods and systems, including computer-implemented methods, computer-program products, and computer systems, for adaptive receiver deghosting of offshore seismic data through an adaptive receiver deghosting model. Such a model is generated by both backward and forward propagating a dense seismic wavefield at the water surface to streamer locations, together with tunable parameters. In some implementations, this dense seismic wavefield that is backward and forward propagated can be sparsely represented in a certain transformation domain.

In a general implementation, an offshore seismic dataset of a surveyed subsurface is received. The offshore seismic dataset having been collected by receivers that comprise a streamer deployed relative to a water surface. The offshore seismic dataset including a seismic wavefield. An initial plane value for a reflectivity of the water surface and an initial location value for a position of the streamer are determined. A receiver deghosting model is generated by backward and forward propagating the seismic wavefield at the water surface to streamer locations. The receiver deghosting model including tuning parameters. The tuning parameters are adjusted according to an adaptive target residue and an inversion target residue. Receiver deghosted output is generated according to the receiver deghosting model, and a productivity of the surveyed subsurface is determined based on the receiver deghosted output.

Implementations include techniques, such as methods, systems, or devices, to improve the accuracy of marine seismic surveys used to map surveyed subsurfaces under realistic acquisition conditions. In some implementations, the described adaptive receiver deghosting system requires neither multi-component nor dense data acquisition, and may use undersampled pressure data as input. The described system can also be employed in various data acquisition schemes, such as collection streamers. These collection streamers may be configured in various forms, such as flat, slanted or even curved, and deployed at various profiles. The described system is capable of accounting for uncertainties occurred during the data acquisition process. Such uncertainties may include fluctuating water surface, incorrect water velocity, and inaccurate information about the receiver locations. The described system reduces financial costs as it may not require particular data points, such as accurate water velocity, exact receiver locations, and correct water surface profile, from the data acquisition.

The details of one or more implementations of the subject matter of this specification are set forth in the accompanying drawings and the later description. Other features, aspects, and advantages of the subject matter will become apparent from the description, the drawings, and the claims.

DESCRIPTION OF DRAWINGS

FIG. 3 depicts an example system to conduct marine seismic surveys through data acquisition using streamers.

FIGS. 4A-4C depict the use of tunable matrices to adaptively account for uncertainties during the data acquisition process.

DETAILED DESCRIPTION

This disclosure generally describes adaptive receiver deghosting of seismic streamer data using constrained inversion and is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from the scope of the disclosure. Thus, the present disclosure is not intended to be limited to the described or illustrated implementations, but is to be accorded the widest scope consistent with the principles and features disclosed in this application.

Receiver deghosting for marine seismic surveying data is a data processing challenge in geophysical prospecting. As the air-water interface is a strong reflector for pressure waves, upgoing seismic waves are reflected downward at the air-water interface and then further propagate back into the water where they interfere with an existing seismic wavefield at the seismic streamer locations. This effect is referred to as the "Receiver Ghost" effect in marine seismic data acquisition and causes distortions of both phase and amplitude. A representative notch may also be observed in the frequency spectrum of the recorded signals.

Figure 1A:
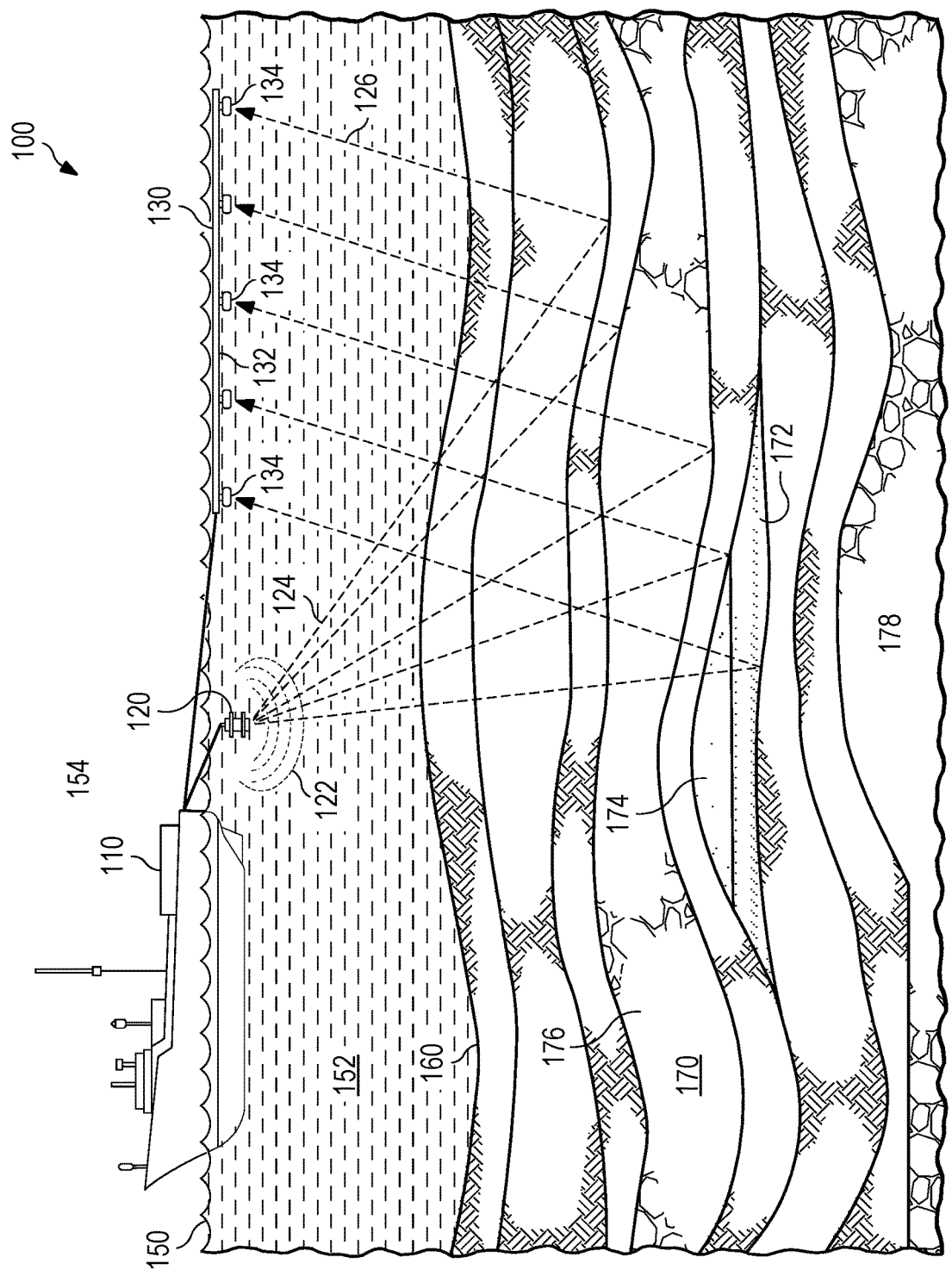
FIGS. 1A-1B depict an example system to conduct marine seismic surveys to locate potential well sites for the drilling of hydrocarbons or for other subsurface investigation purposes.
Figure 1B:
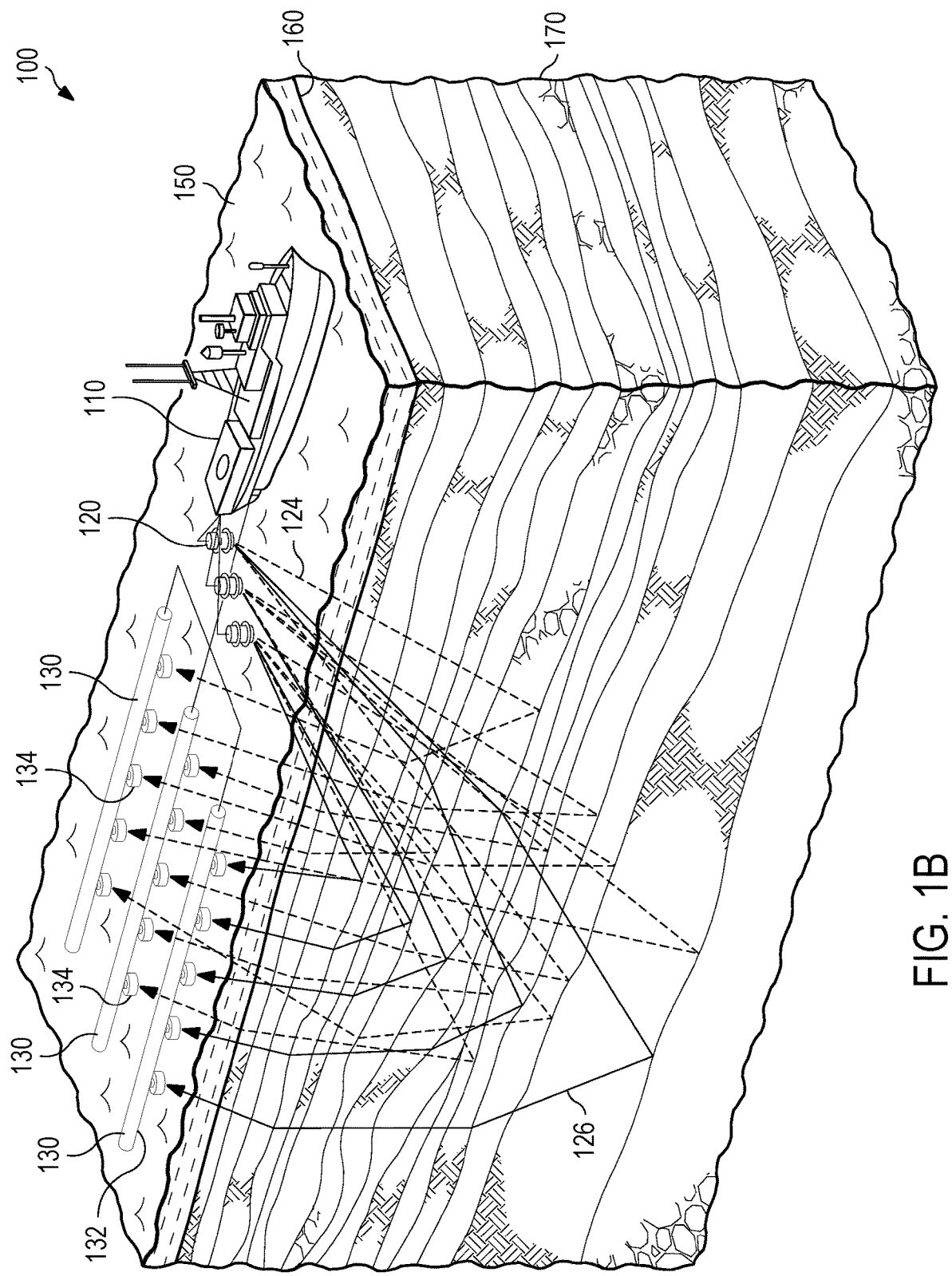

FIGS. 1A-1B depict an example system 100 to conduct marine seismic surveys to locate potential well sites for the drilling of hydrocarbons. Such marine seismic surveys may be used to probe beneath the surface of the seabed 160 to discover the underlying features that make up the underground structures to, for example, locate potential well sites for the drilling of hydrocarbons or for other subsurface investigation purposes. The example system 100 includes a survey vessel 110 that is towing a mechanical wave source(s) 120, such as a seismic wave source, and one or more streamers 130 at a certain location. The mechanical wave source 120 may include a plurality of gun arrays that are used as source devices to generate an impulse of energy or waves 122 during marine seismic acquisition. A gun array may include several sub-arrays, each being a linear (rigid or soft) alignment of floats to which guns are roped and submerged. For example, the gun array may be submerged to a depth from 6 to 10 meters (m) (other depth may be used depending on, for example, the type of gun array, topography, and weather conditions). The types of guns used to generate the waves of energy may include, for example, water guns, air guns, marine vibrators, or sleeve guns. Other types of mechanical wave source 120 include explosives, such as dynamite and water gel explosives.

A water gun includes a piston that is driven through the water to produce a vacuum bubble. When this bubble collapses, acoustic energy is radiated. The pressure signature from a water gun has pressure variations or a precursor before the main pressure pulse. This precursor is caused by the initial acceleration of the water, and special water gun processing (signature deconvolution) must be performed.

An air gun includes one or more pneumatic chambers that are pressurized with, for example, compressed air. When an air gun is fired, a solenoid is triggered. The triggered solenoid releases air into a fire chamber which in turn causes a piston to move, thereby allowing the air to escape the main chamber. This release of air generates a pressure pulse and forms an air bubble. This air bubble oscillates, generating a sequence of decaying pressure variations that follow the initial pulse.

In some implementations, the mechanical wave source 120 is an air gun array that includes air guns of different volumes. The volume of air in the bubble and its pressure depends on the size of the air gun used and the pressure at which it is operated. When multiple air guns are fired in close vicinity of one another, it is possible to get a strong initial pulse and a weak bubble sequence because the composite bubble formed is not spherical and thus does not tend to support oscillations. The firing of these air guns creates bubble oscillations that are of different periods, which tend to cancel one another while the initial pulses reinforce. Thus, a signal approaching an impulse is generated and measured based on its response to the earth. For example, the array can be fired in concert to create an optimum initial shock wave followed by a minimum reverberation of the air bubble(s).

The output of the mechanical wave source 120 may be illustrated by a normalized pressure time sequence referred to as a signature. One measure of the strength of the source is the peak-to-peak pressure, which is often quoted in pressure units of bars at one bar meters. Another measure of the performance of the array is the peak-to-bubble ratio, which is the peak-to-peak magnitude of the initial pulses divided by the magnitude of the residual bubble oscillations.

The one or more streamers 130 include surface marine cables 132. The marine cables 132 are a buoyant assembly of electrical wires that connect the receivers 134. In some implementations, the receivers 134 are mounted throughout a certain length of the cable 132 and electrically connected in a series and run parallel to form a receiver array, a station, or a group. For example, a group may be formed along a defined length of the cable 132 and include a number of the receivers 134.

In some implementations, the receivers 134 are piezoelectric devices, such as a hydrophone, that create an electrical signal in response to pressure changes. In other implementations, the receivers 134 are microelectromechanical systems (MEMS) devices that can also measure particle velocity components. These receivers 134 are employed within the example system 100 to detect the mechanical waves generated by the mechanical wave source 120 that are reflected or refracted by the seabed 160, the subsurface 170, or both. In some implementations, the cables 132 include electronics to convert an analog signal generated by the receivers 134 to a digital data.

As depicted in FIGS. 1A-1B, multiple streamers 130 may be deployed from the vessel 110 to increase the amount of data acquired in each pass. The streamers 130 may be disposed horizontally, for example, at a constant depth, or at an angle relative to the water surface 150 of a body of water, such as an ocean or lake. The air 154 is above the water surface 150. In some implementations, the streamer may be several thousand meters long based on the objective of the survey being performed by the system example 100.

Figure 2:
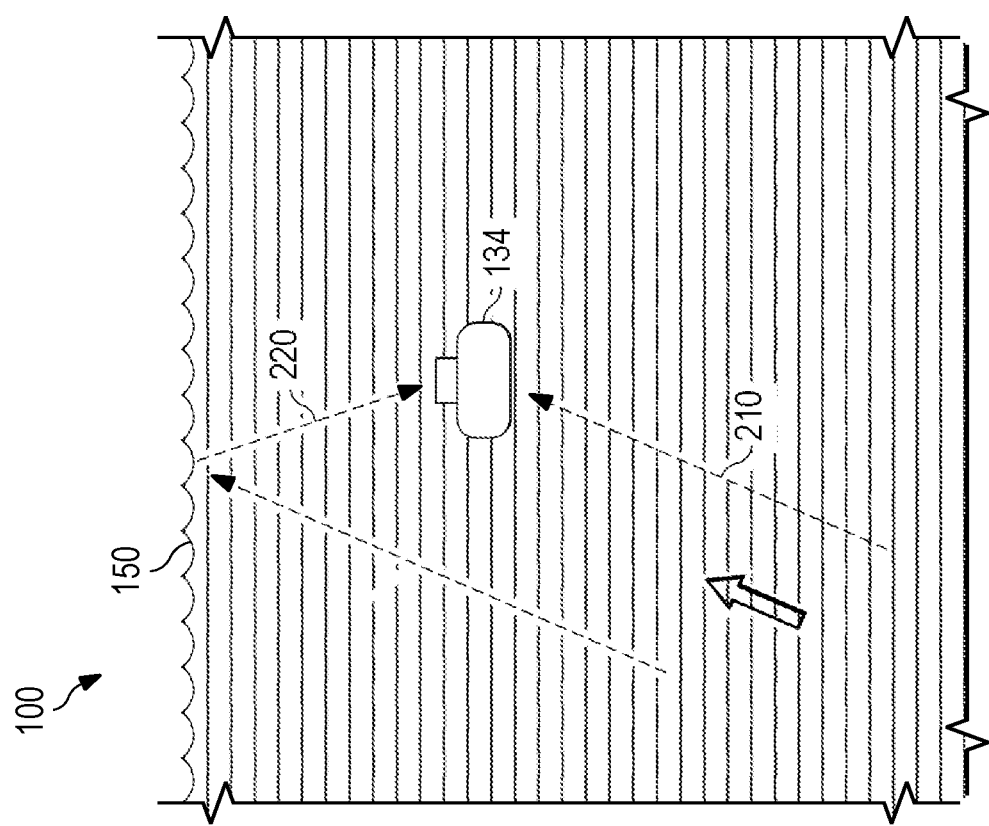
FIG. 2 depicts a primary-wave and a ghost wave that can be received by a receiver during a seismic survey.

The total measured pressure wavefield with the receiver ghost effect can be considered as a blended wavefield between the upgoing wavefield and the surface-reflected downgoing wavefield, as depicted in FIG. 2. The mechanical wave sources 120 may provide single pulses or continuous sweeps of energy, generating the waves 122. The waves 122 emitted by the mechanical wave sources 120 may be substantially spherical (for example, a wave propagates in all directions from the mechanical wave sources 120). The generated waves may be referred to as a wavefield. The generated wavefield 122 travels through a medium such as water 152 and subsurface 170. Some of the waves travel downward and are then reflected and refracted by the seabed 160 or the subsurface 170. These particular wave paths of the wavefield 122 are depicted in FIGS. 1A and 1B as downward propagated wave 124 and reflected wave 126. The reflected or refracted waves 126 propagate upwardly and are detected by the receivers 134. The downward propagated wave 124 and the reflected waves 126 are referred to as the primary or ghost-free wave. The recorded primary waves may be used to determine the composition and features of the subsurface 170 below the seabed 160. Such structures of the subsurface 170 may include oil 172, gas 174, sedimentary rock 176, and impermeable rock 178.

FIG. 2 depicts the primary waves 210 and ghost waves 220 that can be received by receivers 134. As depicted in FIGS. 1A-1B, the wavefield emitted by the mechanical wave source 120 initiates a pressure wavefield in all directions. The interface between the water and air, represented as the water surface 150 in FIGS. 1A-1B and 2, is well approximated as a quasi-perfect reflector. As such, the water surface 150 acts as a mirror for the generated waves 122. Ghost waves 220 are reflected by the water surface 150 are then detected by receivers 134. Reflected waves are referred to as ghost waves because they are due to a spurious reflection. When the energy from the ghost wave 220 combines with the primary wave 210, the wave shape is changed and the "ghost" is created.

As depicted in FIG. 2, the source wavefield may be reflected in an upward trajectory from the seabed 160 (not shown), pass the receivers 134, and reflected by the water surface 150 to generate the received ghost waves 220. Once reflected by the water surface 150, the ghost waves 220 are detected by the receivers 134 with a certain delay from the primary waves 210. Thus, the ghost waves 220 interfere with the primary waves 210. For example, due to this "ghosting", certain frequencies are interfered with while other frequencies are boosted. Additionally, some frequencies may be completely eliminated or "notched" by this ghosting effect. To state another way, the seismic ghost wavefields distort the frequency by creating spectral notches and the phase spectrum of the recorded seismic data. For example, the arrival of the ghost waves 220 at the receiver 134 may have a degenerative effect and cause notches, or gaps, in the frequency content recorded. These notches cause inaccuracies in an image or model of the subsurface 170 generated based on the received waves.

Deghosting is the process of removing the ghost waves' information from the results of the seismic analysis. Further, measurements can be processed for obtaining the correct position of the various parts (reflectors) of the subsurface 170. Such a processing method is the migration. Furthermore, with the advancement of marine broadband data acquisition and processing, applying proper three-dimensional (3D) deghosting technologies better preserves both bandwidth and resolution in the final receiver ghost-free signals.

To date, various receiver deghosting methods have been proposed, including or variants of: 1) use of Green's theorem as a general theoretical framework in deghosting; 2) use of a filter in the frequency (F)—wavenumber (K) domain; 3) use of a twin seismic streamer configuration; 4) use of both a hydrophone and geophone as a robust deghosting tool for ocean bottom cable (OBC) data (generally referred to as PZ-summation, which exploits the unique physical characteristics of the air-water interface reflected pressure and particle velocity signals); 5) consideration of multi-component seismic streamer data as an input for deghosting; 6) τ-p inversion; 7) use of an approximated pressure gradient to remove ghost signals; 8) application of a deconvolution method to suppress ghost signals; 9) deghosting based on building mirror data first using ray tracing; 10) consideration of similarity between deghosting and de-blending to handle deghosting as de-blending; 11) deghosting with over/under source acquisition; 12) developing an optimal stacking procedure that can help minimize ghost effects in a final image; 13) use of joint interpolation-deghosting to achieve genuine 3D deghosting; and 14) a method to exploit the causality property of the ghost effect by honoring, as much as possible, wave propagation.

Regardless of the listed and other receiver ghosting methods, a robust and physical 3D receiver deghosting utility is still lacking. Almost all of the proposed methods require dense wavefield sampling, but in real data acquisition a crossline interval is normally much larger than an inline interval (for example, typically, the ratio of the inline interval to the crossline interval varies between 1:4 and 1:16), which violates this fundamental assumption. As a trade-off solution, some methods are configured to work only on densely sampled two-dimensional (2D) inline data or even to make a bold one-dimensional (1D) propagation assumption. Other proposed methods involve interpolation explicitly as an independent operation. However, for real data situations, interpolation by itself is not a trivial problem, making an optimal application of both steps difficult without propagation of errors. Furthermore, environments where streamer data is acquired, such as depicted in FIGS. 1A-1B and 2, are dynamic. Therefore, the precise location and profile of the water surface, the streamer, and its respective receivers are unknown. As a result, for 3D real data, the receiver deghosting challenge includes: 1) receiver ghost signal removal with sometimes only sparsely measured data available and 2) uncertainties during the data acquisition process, which may include a dynamic sea surface or inaccurate receiver locations.

In view of the forgoing, the described deghosting system adaptively receiver deghosts seismic streamer data via a constrained inversion. The described system rigorously honors wave propagation phenomena during the receiver ghost process in a real 3D sense, and a transformation domain, such as a redundant, hybrid, apex-shifted Radon dictionary (RHARD), is employed as a basis dictionary for reconstructing a dense upgoing wavefield at the surface of water. In some implementations, the described deghosting system frames the receiver deghosting problem as a least absolute shrinkage and selection operator (Lasso) problem, with a goal to minimize a mismatch between actual measurements and a simulated wavefield with an L1 constraint in the extended Radon space exploited to handle an under-determination challenge in an inversion.

Figure 4A:
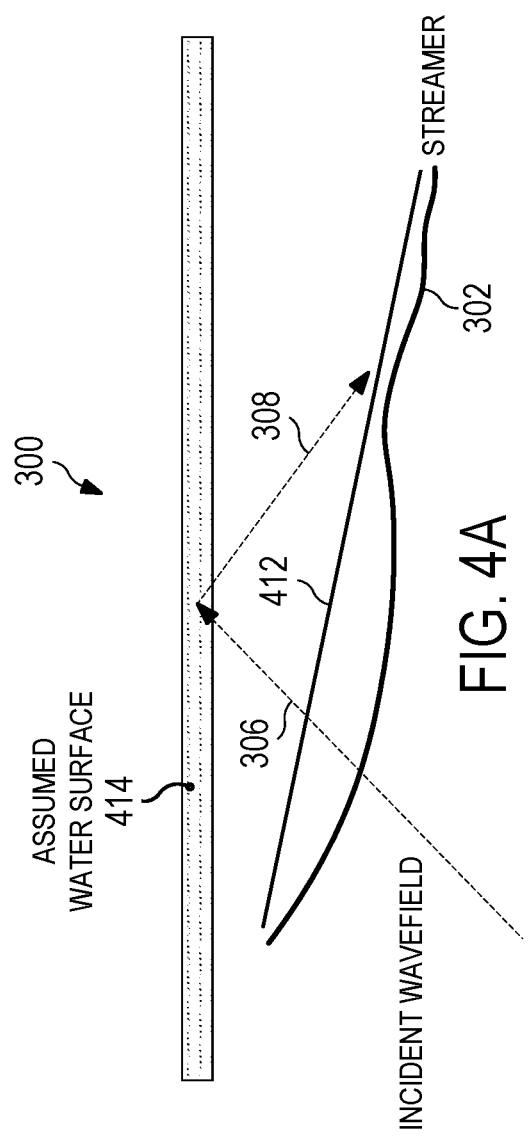

FIG. 3 depicts an example system 300 to conduct marine seismic surveys through data acquisition using streamers. The example system 300 is substantially similar to the example system 100 depicted in FIGS. 1A-1B and 2, and includes a streamer 302 that is substantially similar to the streamers 130. The streamer 302 may be deployed trailing a vessel (not show) at a certain location below the water surface 304 and includes receivers (not shown), such as receivers 134. The streamer 302 can be in any form, such as, for example, curved, horizontal, or slanted. Similar to the depiction in FIG. 2, upgoing incident wavefield 306 passes seismic streamer 302 and reflects off the water surface 304 to generate downgoing incident wavefield 308. A realistic environment for data acquisition using streamers is dynamic. Therefore, the precise location and profile of the water surface and streamer and its respective receivers are unknown, as it is extremely difficult to capture such detailed information in real-time. As a result, during the process of receiver deghosting, an assumed water surface 414 and a designed streamer location and profile 412, as depicted in FIG. 4A, are employed to carry out related data processing steps. These approximations bring in uncertainties in the deghosting output that provide a degradation of the result, which is not acceptable in modern seismic data processing, where one of the aims is to obtain reliable results across the full bandwidth of the data. Therefore, there is a need for an adaptive receiver deghosting system capable of compensating for these uncertainties.

As depicted in FIG. 4B, the desired upgoing incident wavefield 306 is parameterized at the assumed surface of the water 414 using dense sampling (dense wavefield) 424 and both forward propagated with water surface reflection considered (308) and backwardly propagated incident wavefield 418 to form measured data. Performing incident wavefield parameterization at the assumed surface of the water 414 better meets the plane surface requirement in the wavefield propagation theory on an unclosed surface.

Data sparsity is also considered in seismic streamer data processing. The inline direction of the seismic streamer is a dense data acquisition direction, while the crossline direction has a much larger interval. For example, the ratio of inline interval to crossline interval may be between 1:4 and 1:16. As a result, a final acquired seismic wavefield data may be aliased in the crossline direction, which complicates receiver deghosting.

To optimally handle both the receiver deghosting problem and data sparsity, both challenges should be simultaneously addressed while rigorously honoring actual physics principles. Therefore, the aim is finding a densely sampled upgoing wavefield that, after including the correct physics of a free water surface, matches measured data at receiver locations. The previously described receiver ghosting process occurs in water, which the described systems treats as an isotropic and homogeneous medium. Therefore, acoustic wave propagation theory is sufficient, and the Rayleigh integral is chosen to physically describe the ghosting effect.

In some implementations, for the Rayleigh integral to hold, two conditions must be fulfilled: 1) the integral surface must be a plane and 2) wavefield sampling on the plane must be dense. The dense wavefield sampling requirement is automatically met in the described system, as a dense wavefield being targeted as the final solution. However, the integral plane conditions are handled with care so that the system can be versatile and robust to handle differing streamer shapes (even including feathering effects in real data acquisition scenarios).

In the described system, the surface of the water 304, which is roughly planar, is used as an integral plane, and the dense upgoing incident wavefield 306 at the surface of the water is treated as a final solution target. The receiver ghosting process can be described as a summation of the backwardly propagated incident wavefield 418 (from the water surface 304 to the receiver locations) and the water surface reflected and forwardly propagated (downgoing) incident wavefield 308 (also from the surface of the water 304 to the receiver locations).

Mathematically, the receiver ghosting process can be defined according to Equation (1):

$$b = SP^-y + SP^+Ry = S(P^- + P^+R)y, \quad (1)$$

where b is a vector that includes the measured data from data acquisition, y is a dense wavefield vector at the surface of the water, S is a sub-sampling matrix corresponding to a real, sparse data acquisition scheme in both the inline and the crossline directions, $P^-$ and $P^+$ are one-way wavefield propagation matrices (backward and forward, respectively) from the surface of the water to pre-defined dense target locations, and R is the reflection coefficient matrix at the assumed water surface which is $-I$ as the assumed water surface is planar, $P^+$ is the forward propagation matrix from the assumed water surface to the designed streamer locations, and $P^-$ is the backward propagation matrix from the assumed water surface 414 to the designed streamer location 412.

The dense wavefield 424 at the surface of the water 304 can be considered a 3D seismic data cube $f(g_x, g_y, t)$, where $g_x$ and $g_y$ are x position and y position of the receiver at the surface, and t is time. This dense wavefield 424 is packed into the vector y of Equation (1).

With S (indicating that the measured data is sparse (that is, dim(b)<dim(y)) in Equation (1)), $S(P^- + P^{3+}R)$ is generally not mathematically invertible. To overcome this mathematical problem, the receiver deghosting problem may be defined according to Equations (2.1) and (2.2):

$$\min_x \|Ax - b\|_2 \quad s.t. \quad F(x) < \tau, \quad (2.1)$$

where:

$$A = S \cdot (P^- + P^{3+}R)D. \quad (2.2)$$

In Equations (2.1) and (2.2), x is a vector containing an encoded dense wavefield at the surface of the water and D is the transformation matrix to build the dense wavefield from x, which ensures that y=Dx, and x is the encoded dense wavefield in a certain dictionary. Function F(x) represents a certain sparseness metric of x, which can be $L_1$, $L_2$, $L_{12}$, Cauchy or something similar, and represents a user-defined threshold value. A suitable dictionary selected for Equation (2.1) is the foundation for a sparse representation of the dense wavefield y at the surface of the water 304.

As depicted in FIG. 4C, to account for the uncertainties caused by the discrepancies both between the assumed water surface 414 and the actual water surface 304 (see FIG. 3) and between the designed streamer profile 412 and the actual streamer profile, depicted as streamer 302, two modifications are made. First, the water surface reflectivity (R) 430 is detached from the water surface 304. To state this another way, although the water surface 304 is still assumed to be a planar surface, its reflectivity matrix R is no longer fixed at $-I$ but rather is allowed to take scalar values to compensate for the complicated amplitude variations due to the realistic reflection effect. Second, two time-shift matrices, $M^+$ 432 and $M^-$ 434, are introduced to compensate for the spatial mismatch between designed receiver profile 412 and the actual streamer profile 302. The new model may be defined according to Equations (3.1) and (3.2):

$$\min_x \|A_{new}x - b\|_2 \quad s.t. \quad F(x) < \tau, \quad (3.1)$$

$$\text{with } A_{new} = (M^-SP^- + RM^+SP^+)D, \quad (3.2)$$

where the symbols x, F(x), S, $P^+$, $P^-$ and D are the same as in equations (2.1) and (2.2); $M^-$ 434 is the time-shift matrix applied to the backward propagated trace at the designed streamer location, and $M^+$ 432 is the time-shift matrix applied to the forward propagated trace 308 at the designed streamer location 412; R 430 is the reflection coefficient applied to the forward propagated trace 308 at the designed streamer location 412.

In the depicted context, an inversion process includes calculating, from the set of observations, such as, the wavefield data collected by the receivers, the causal factors that produced them. Such causal factors can include, for example, the forward propagated 308 and backwardly propagated 418 incident wavefield. This inversion process can be facilitated so that a solution that meets the constraint, $F(x) < \tau$, can be obtained with a receiver ghosting model constructed using Equations 3.1 and 3.2 using $M^+$, $M^-$ and R. Also, note that all these extra matrices, $M^+$, $M^-$ and R, apply to the traces at designed streamer locations.

$A_{new}x$ in equation (3.1) can be defined according to Equation (4):

$$A_{new}x = \begin{bmatrix} M_1^- & 0 & 0 \\ 0 & \ddots & 0 \\ 0 & 0 & M_n^- \end{bmatrix} SP^-Dx + \begin{bmatrix} R_1 & 0 & 0 \\ 0 & \ddots & 0 \\ 0 & 0 & R_n \end{bmatrix} \begin{bmatrix} M_1^+ & 0 & 0 \\ 0 & \ddots & 0 \\ 0 & 0 & M_n^+ \end{bmatrix} SP^+Dx \quad (4)$$

where $SP^-Dx$ ($SP^+Dx$) is the vector packed with backward (forward) propagated traces from the assumed water surface 414 to designed streamer locations 412; $M_i^-$ is a time-shift matrix applied to trace i in $SP^-Dx$; $M_i^+$ is a time-shift matrix applied to trace i in $SP^+Dx$; $R_i$ is the reflection matrix applied to trace i in $SP^+Dx$.

In equation (4), $M_i^-$ and $M_i^+$ are implemented in frequency domains and may be defined according to Equations (5), (6), (7), and (8):

$$M_i^- = F^{-1} \cdot \Psi^- \cdot F \quad (5)$$

$$\Psi^- = \begin{bmatrix} \exp(i\omega_1 \Delta t_-) & 0 & 0 \\ 0 & \ddots & 0 \\ 0 & 0 & \exp(i\omega_M \Delta t_-) \end{bmatrix} \quad (6)$$

$$M_i^+ = F^{-1} \cdot \Psi^+ \cdot F \quad (7)$$

$$\Psi^+ = \begin{bmatrix} \exp(-i\omega_1 \Delta t_+) & 0 & 0 \\ 0 & \ddots & 0 \\ 0 & 0 & \exp(-i\omega_M \Delta t_+) \end{bmatrix} \quad (8)$$

where F is the Fourier transformation matrix, $F^{-1}$ is the inverse Fourier transformation matrix, $\psi^-$ and $\psi^+$ are the corresponding time-shift matrices with the shifted time being $\Delta t_-$ and $\Delta t_+$ for all available frequencies.

$R_i$ in equation (4) is suggested to be only responsible for compensating the amplitude variation over the whole frequency spectrum, and this should make the inversion more robust to noise jitters. $R_i$ may be defined according to Equation (9):

$$R_i = \begin{bmatrix} r_i & 0 & 0 \\ 0 & \ddots & 0 \\ 0 & 0 & r_i \end{bmatrix} \quad (9)$$

where $r_i$ is a scalar.

Figure 5:
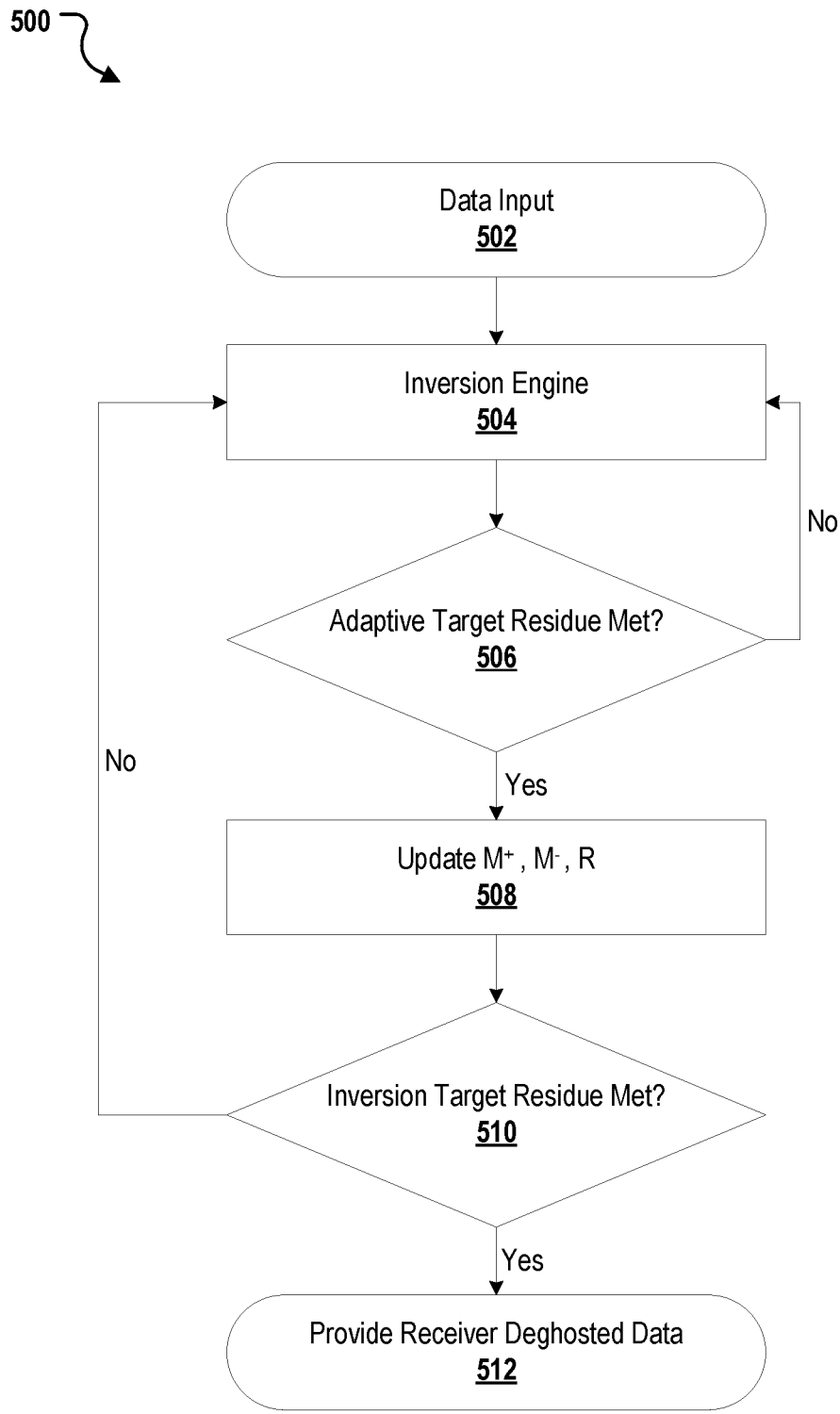
FIG. 5 depicts an example process for providing deghosted data for determining a productivity of the surveyed subsurface according to implementations of the present disclosure.

Equations (3.1)-(9) form a framework of adaptive receiver deghosting employed within the described system, which is depicted in FIG. 5. An inversion engine is a mathematical solver to solve, for example, Equation (3.1) for x once a concrete constraint term F(x) is provided. The choice of the inversion engine may depend on the concrete constraint applied on x in equation (3.1). For example, the inversion may be a spectral projected gradient (SPGL1) solver when an L1 constraint is taken. The variables $M^+$ and $M^-$ use the identity matrix, which is a square matrix with the elements of the principle diagonal being 1s and the other elements being 0s, as an initial value, while R uses the negative identity matrix as its initial value. For example, the process may begin in the same manner as in equations (2.1) and (2.2), and when certain adaptive target residues, which can be relative data mismatch ratios that are pre-defined by users, are met the tuning parameter matrices are updated.

The described system adaptively accounts for uncertainties, which may be caused by, for example, a fluctuating water surface, incorrect receiver location information, or inaccurate estimation of the water velocity, during the process of receiver deghosting. The described system, generates an adaptive receiver deghosting model, by both backward 418 and forward 308 propagating the dense seismic wavefield 424 at the water surface to streamer locations 302, together with tunable parameters, such as the water surface reflectivity matrix (R) 430 and two time-shift matrices ($M^+$ 432 and $M^-$ 434)). The described system is able to minimize the mismatch between actual measurements and the simulated wavefield based on the adaptive receiver deghosting model by tuning $M^+$, $M^-$ and R to facilitate the inversion process needed to retrieve the target dense seismic wavefield at the water surface. For example, tuning $M^+$, $M^-$ and R may include adjusting values of $\Delta t_-$, $\Delta t_+$ and $r_i$ in equations (6), (8) and (9) respectively.

In some implementations, although the most suitable adaptive target residue sequence should be case dependent, the sequence of (0.7, 0.5, 0.3, 0.2, 0.1) may be employed as the initial trial choice provided the input data is normalized by its total energy.

FIG. 5 depicts an example process 500 for providing deghosted data for determining a productivity of the surveyed subsurface according to implementations of the present disclosure. Wavefield data is collected (502) from receivers placed on a streamer deployed, for example, as depicted in FIGS. 1A-4C, to survey the subsurface. The wavefield data is provided (504) to the inverse engine where a receiver deghosting model is generated based on an initial value selected for the planar water surface and the location of the receivers relative to the water surface. The adaptive tuning parameters ($M^+$, $M^-$ and R) are tuned to speed up the inversion process and provide the deghosted results for the wavefield data. The results from the inversion engine are checked (506) to see if an adaptive target residue is met. When the adaptive target residue is met, the results from the values $M^+$, $M^-$ and R are updated (508). When the adaptive target residue is not met, the results from the inversion engine are sent back to the inversion engine for processing (504). In some implementations, updating the tuning parameters ($M^+$, $M^-$ and R) may involve parameter scanning. For example, for a given trace $b_i$, $M^+$, $M^-$ and R may be scanned within certain ranges with all other parameters fixed to find an optimal solution so that $\|M_i^-(SP^- Dx)_i + R_i M_i^+(SP^+ Dx)_i - b_i\|_2$ can be minimal, and some initial trial ranges can be: $R_i \in [-0.9, -1.1]$ with 0.01 as the scanning step; $\Delta t$ in $M_i^-$ and $M_i^+$ is within [−4 millisecond (ms) 4 ms] with the scanning step of 0.5 ms. Additionally, the misfit in equation (3.1) is decreasing. This scheme can thus guarantee the convergence of the inversion.

The results from the inversion updating the values for the tuning parameters ($M^+$, $M^-$ and R) are checked (510) to see if an inversion target residue is met. In some implementations, the inversion target residue can be defined in the same way as the adaptive target residue, but where the inversion target residue bears a value less than the minimum value in the adaptive target residue sequence. In some implementations, both the inversion target residue and the adaptive target residue can be defined as the relative mismatch between the actual measurements and the simulated wavefield. For example, the adaptive target residue can be specified as (0.7, 0.5, 0.3, 0.2, 0.1), while the inversion target residue can be specified as 0.05.

When the adaptive target residue is met, the results from the values tuning parameters ($M^+$, $M^-$ and R) the deghosted results are provided (512) for determining a productivity of the surveyed subsurface. When the inversion target residue is not met, the results are sent back to the inversion engine for processing (504). Once the process 500 is carried out, the final adaptive receiver deghosted output wavefield is defined according to $M^- SP^- Dx$. Furthermore, as the sea status is dynamic, this process can be carried out in different time windows of the input data such that time dependent uncertainties in receiver deghosting can be accounted for.

Figure 6:
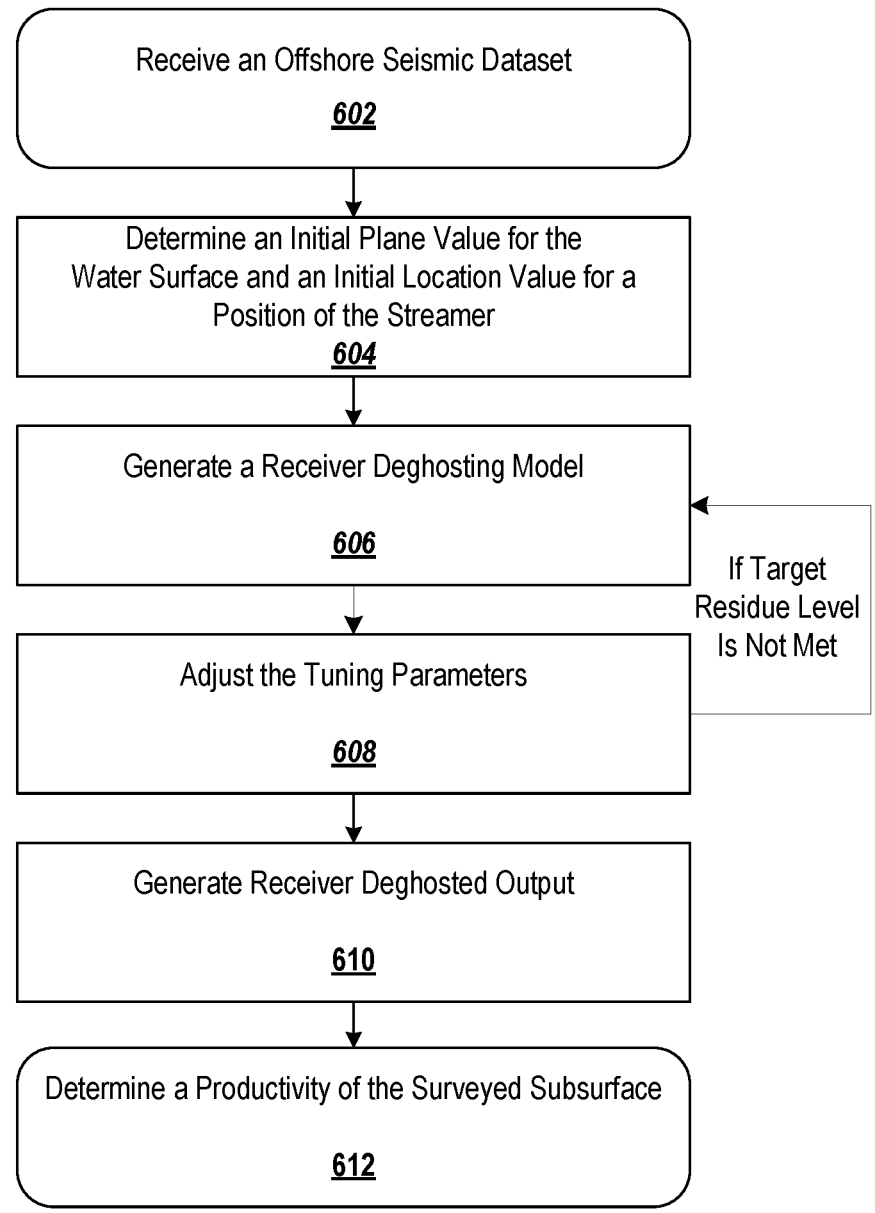
FIG. 6 depicts a flowchart of an example method for adaptive receiver deghosting of seismic streamer data, according to an implementation.

FIG. 6 depicts a flowchart of an example method 600 for adaptive receiver deghosting of seismic streamer data, according to an implementation. For clarity of presentation, the description that follows generally describes methods 600 in the context of the other FIGS. in this description. However, it will be understood that method 600 may be performed, for example, a suitable system, environment, software, and hardware, or a combination of systems, environments, software, and hardware as appropriate. In some implementations, various steps of method 600 can be run in parallel, in combination, in loops, or in any order.

At 602, an offshore seismic dataset of a surveyed subsurface is received. The offshore seismic dataset having been collected by receivers on a streamer. The streamer having been deployed relative to a water surface. The offshore seismic dataset includes a seismic wavefield. From 602, the process 600 proceeds to 604.

At 604, an initial plane value for a reflectivity of the water surface and an initial location value for a position of the streamer is determined. From 604, the process 600 proceeds to 606.

At 606, a receiver deghosting model is generated by backward and forward propagating the seismic wavefield at the water surface to streamer locations, the receiver deghosting model including tuning parameters. In some implementations, the receiver deghosting model simulates the seismic wavefield to minimize to facilitate an inversion process. In some implementations, the tuning parameters include a water surface reflectivity matrix and two time-shift matrices. In some implementations, the water surface reflectivity matrix takes scalar values to compensate for amplitude variations. In some implementations, the time-shift matrices compensate for a spatial mismatch between a designed receiver profile and an actual streamer profile. In some implementations, the receiver deghosting model is defined according to Equations (3.1) and (3.2). In some implementations, $A_{new}x$ (from Equation (3.2)) is defined according to Equation (4). In some implementations, $M_i^-$ and $M_i^+$ (from Equation (4)) are implemented in frequency domains and defined according to Equations (5)-(8). In some implementations, $R_i$ (from Equation (4)) is defined according to Equation (9). From 606, the process 600 proceeds to 608.

At 608, the tuning parameters are adjusted according to an adaptive target residue and an inversion target residue. In some implementations, the adaptive target residue and the inversion target residue are relative data mismatch ratios that are pre-defined by users, and the inversion target residue bears a value less than a minimum adaptive target residue. When the target residue level is met, the process 600 proceeds to 610. When the target residue is not met, the process 600 proceed back to 606 with the results from 608 for further processing.

At 610, receiver deghosted output is generated according to the receiver deghosting model. From 610, the process 600 proceeds to 612.

At 612, a productivity of the surveyed subsurface is determined based on the receiver deghosted output. From 612, the process 600 ends.

Figure 7:
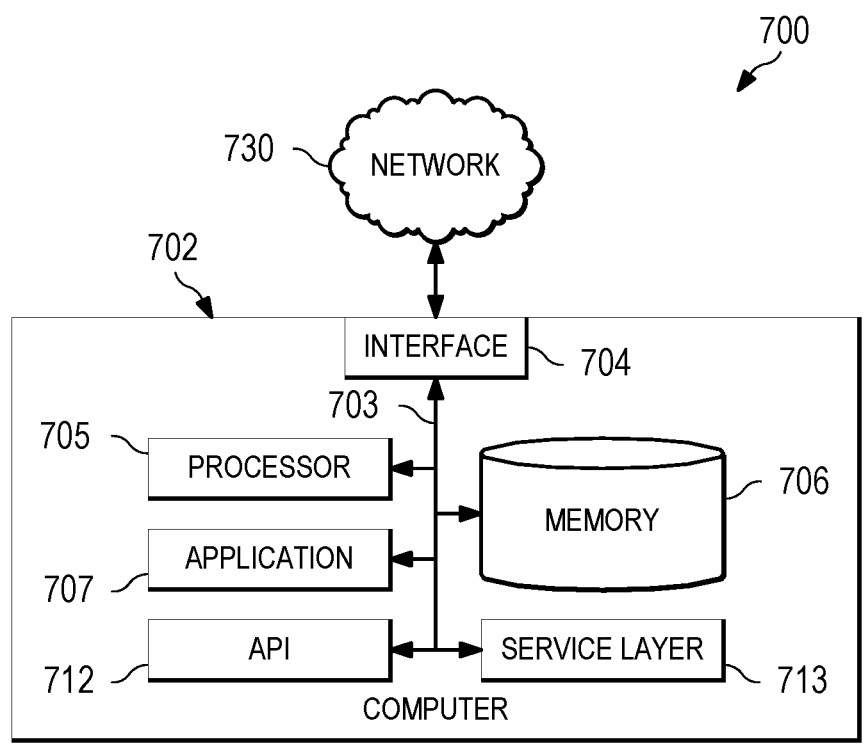
FIG. 7 depicts a block diagram of an exemplary computer system used to provide computational functionalities associated with described algorithms, methods, functions, processes, flows, and procedures as described in the instant disclosure, according to an implementation.

FIG. 7 depicts a block diagram of a computer system 700 used to provide computational functionalities associated with described algorithms, methods, functions, processes, flows, and procedures as described in the instant disclosure, according to an implementation. The illustrated computer 702 is intended to encompass a computing device, such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or a combination of environments.

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in a software application. In addition, requests may also be sent to the computer 702 from internal users (for example, from a command console or by other access method), external or third parties, other automated applications, as well as any other entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, or applications. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other terminology may be used interchangeably as without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a computer-implemented method executed by one or more processors, includes receiving an offshore seismic dataset of a surveyed subsurface. The offshore seismic dataset having been collected by receivers on a streamer. The streamer having been deployed relative to a water surface. The offshore seismic dataset includes a seismic wavefield. An initial plane value for a reflectivity of the water surface and an initial location value for a position of the streamer are determined. A receiver deghosting model is generated by backward and forward propagating the seismic wavefield at the water surface to streamer locations. The receiver deghosting model includes tuning parameters. The tuning parameters are adjusted according to an adaptive target residue and an inversion target residue. Receiver deghosted output is generated according to the receiver deghosting model. A productivity of the surveyed subsurface is determined based on the receiver deghosted output.

The foregoing and other described implementations can each optionally include one or more of the following features.

A first feature, combinable with any of the following features, the receiver deghosting model simulates the seismic wavefield to minimize to facilitate an inversion process.

A second feature, combinable with any of the previous or following features, the tuning parameters include a water surface reflectivity matrix and two time-shift matrices.

A third feature, combinable with any of the previous or following features, the water surface reflectivity matrix takes scalar values to compensate for amplitude variations.

A fourth feature, combinable with any of the previous or following features, the time-shift matrices compensate for a spatial mismatch between a designed receiver profile and an actual streamer profile.

A fifth feature, combinable with any of the previous or following features, the receiver deghosting model is defined according to according to Equations (3.1) and (3.2).

A sixth feature, combinable with any of the previous or following features, $A_{new}x$ (from Equation (3.2)) is defined according to Equation (4).

A seventh feature, combinable with any of the previous or following features, $M_i^-$ and $M_i^+$ (from Equation (4)) are implemented in frequency domains and defined according to Equations (5)-(8).

An eighth feature, combinable with any of the previous or following features, wherein $R_i$ (from Equation (4)) is defined according to Equation (9).

A ninth feature, combinable with any of the previous or following features, the adaptive target residue and the inversion target residue are relative data mismatch ratios that are pre-defined by users, and wherein the inversion target residue bears a value less than a minimum adaptive target residue.

In a second implementation, one or more non-transitory computer-readable storage media are coupled to one or more processors. Instructions are stored on the one or more non-transitory computer-readable storage media that when executed by the one or more processors, cause the one or more processors to perform operations. These operations include receiving an offshore seismic dataset of a surveyed subsurface. The offshore seismic dataset having been collected by receivers on a streamer. The streamer having been deployed relative to a water surface. The offshore seismic dataset includes a seismic wavefield. An initial plane value for a reflectivity of the water surface and an initial location value for a position of the streamer are determined. A receiver deghosting model is generated by backward and forward propagating the seismic wavefield at the water surface to streamer locations. The receiver deghosting model includes tuning parameters. The tuning parameters are adjusted according to an adaptive target residue and an inversion target residue. Receiver deghosted output is generated according to the receiver deghosting model. A productivity of the surveyed subsurface is determined based on the receiver deghosted output.

The foregoing and other described implementations can each optionally include one or more of the following features.

A first feature, combinable with any of the following features, the receiver deghosting model simulates the seismic wavefield to minimize to facilitate an inversion process.

A second feature, combinable with any of the previous or following features, the tuning parameters include a water surface reflectivity matrix and two time-shift matrices.

A third feature, combinable with any of the previous or following features, the water surface reflectivity matrix takes scalar values to compensate for amplitude variations.

A fourth feature, combinable with any of the previous or following features, the time-shift matrices compensate for a spatial mismatch between a designed receiver profile and an actual streamer profile.

A fifth feature, combinable with any of the previous or following features, the receiver deghosting model is defined according to according to Equations (3.1) and (3.2).

A sixth feature, combinable with any of the previous or following features, $A_{new}x$ (from Equation (3.2)) is defined according to Equation (4).

A seventh feature, combinable with any of the previous or following features, $M_i^-$ and $M_i^+$ (from Equation (4)) are implemented in frequency domains and defined according to Equations (5)-(8).

An eighth feature, combinable with any of the previous or following features, wherein $R_i$ (from Equation (4)) is defined according to Equation (9).

A ninth feature, combinable with any of the previous or following features, the adaptive target residue and the inversion target residue are relative data mismatch ratios that are pre-defined by users, and wherein the inversion target residue bears a value less than a minimum adaptive target residue.

In a third implementation, a system includes: a streamer having at least one receiver; one or more processors; and a computer-readable storage device coupled to the one or more processors and having instructions stored thereon which, when executed by the one or more processors, cause the one or more processors to perform operations that include receiving an offshore seismic dataset of a surveyed subsurface. The offshore seismic dataset having been collected by receivers on a streamer. The streamer having been deployed relative to a water surface. The offshore seismic dataset includes a seismic wavefield. An initial plane value for a reflectivity of the water surface and an initial location value for a position of the streamer are determined. A receiver deghosting model is generated by backward and forward propagating the seismic wavefield at the water surface to streamer locations. The receiver deghosting model includes tuning parameters. The tuning parameters are adjusted according to an adaptive target residue and an inversion target residue. Receiver deghosted output is generated according to the receiver deghosting model. A productivity of the surveyed subsurface is determined based on the receiver deghosted output.

The foregoing and other described implementations can each optionally include one or more of the following features.

A first feature, combinable with any of the following features, the receiver deghosting model simulates the seismic wavefield to minimize to facilitate an inversion process.

A second feature, combinable with any of the previous or following features, the tuning parameters include a water surface reflectivity matrix and two time-shift matrices.

A third feature, combinable with any of the previous or following features, the water surface reflectivity matrix takes scalar values to compensate for amplitude variations.

A fourth feature, combinable with any of the previous or following features, the time-shift matrices compensate for a spatial mismatch between a designed receiver profile and an actual streamer profile.

A fifth feature, combinable with any of the previous or following features, the receiver deghosting model is defined according to according to Equations (3.1) and (3.2).

A sixth feature, combinable with any of the previous or following features, $A_{new}x$ (from Equation (3.2)) is defined according to Equation (4).

A seventh feature, combinable with any of the previous or following features, $M_i^-$ and $M_i^+$ (from Equation (4)) are implemented in frequency domains and defined according to Equations (5)-(8).

An eighth feature, combinable with any of the previous or following features, wherein $R_i$ (from Equation (4)) is defined according to Equation (9).

A ninth feature, combinable with any of the previous or following features, the adaptive target residue and the inversion target residue are relative data mismatch ratios that are pre-defined by users, and wherein the inversion target residue bears a value less than a minimum adaptive target residue.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), an field programmable gate array (FPGA), an application-specific integrated circuit (ASIC), or a graphics processing unit (GPU). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX™, UNIX™, WINDOWS™, MAC OS™, ANDROID™, IOS™ or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, an ASIC, or a GPU.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well. For example, feedback provided to the user can be any form of sensory feedback, such as, visual feedback, auditory feedback, or tactile feedback. Input from the user can be received in forms, such as acoustic, speech, or tactile input. In addition, a computer can interact with a user by sending documents to and receiving documents from a device that is used by the user. For example, by sending web pages to a web browser on a user's client device in response to requests received from the web browser.

The term GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in XML format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for adaptive receiver deghosting executed by one or more processors, the method comprising:
   receiving an offshore seismic dataset of a surveyed subsurface, the offshore seismic dataset including a seismic wavefield and having been collected by receivers that comprise a streamer, the streamer having been deployed relative to a water surface;
   determining an initial plane value for a reflectivity of the water surface and an initial location value for a position of the streamer;
   generating a receiver deghosting model by backward and forward propagating the seismic wavefield at the water surface to streamer locations, the receiver deghosting model including tuning parameters;
   adjusting the tuning parameters according to an adaptive target residue and an inversion target residue;
   generating receiver deghosted output according to the receiver deghosting model; and
   determining a productivity of the surveyed subsurface based on the receiver deghosted output.

2. The method of claim 1, wherein the receiver deghosting model simulates the seismic wavefield to minimize to facilitate an inversion process.

3. The method of claim 1, wherein the tuning parameters include a water surface reflectivity matrix and two time-shift matrices.

4. The method of claim 3, wherein the water surface reflectivity matrix takes scalar values to compensate for amplitude variations.

5. The method of claim 3, wherein the time-shift matrices compensate for a spatial mismatch between a designed receiver profile and an actual streamer profile.

6. The method of claim 3, wherein the receiver deghosting model is defined according to:

$$\min_{x} \|A_{new}x - b\|_2 \text{ s.t. } F(x) < \tau,$$

with $$A_{new} = (M^- SP^- + RM^+ SP^+)D, \quad (3.2)$$

wherein $A_{new}$ is the receiver deghosting model, wherein $\tau$ is a pre-defined constraint value, wherein $P^-$ is a backward one-way wavefield propagation matrix from the water surface to pre-defined dense target locations, wherein $P^+$ is a forward one-way wavefield propagation matrix from the water surface to the pre-defined dense target locations, wherein S is a sub-sampling matrix corresponding to a real, sparse data acquisition scheme in both an inline and a crossline direction, wherein x is a vector containing an encoded dense wavefield at the water surface, wherein D is a transformation matrix to build the dense wavefield from x, wherein b is a vector that includes measured data from the offshore seismic dataset, wherein M⁻ is one of the time-shift matrices and applied to a backward propagated trace at a designed streamer location, wherein M⁺ is one of the time-shift matrices and applied to a forward propagated trace at the designed streamer location, and wherein R is the water surface reflectivity matrix applied to the forward propagated trace at the designed streamer location.

7. The method of claim 6, wherein $A_{new}x$ is defined according to:

$$A_{new}x = \begin{bmatrix} M_1^- & 0 & 0 \\ 0 & \ddots & 0 \\ 0 & 0 & M_n^- \end{bmatrix} SP^-Dx + \begin{bmatrix} R_1 & 0 & 0 \\ 0 & \ddots & 0 \\ 0 & 0 & R_n \end{bmatrix} \begin{bmatrix} M_1^+ & 0 & 0 \\ 0 & \ddots & 0 \\ 0 & 0 & M_n^+ \end{bmatrix} SP^+Dx,$$

wherein SP⁻ Dx (SP⁺ Dx) is a vector packed with backward (forward) propagated traces from an assumed water surface to designed streamer locations, wherein $M_i^-$ is one of the time-shift matrices applied to trace i in SP⁻ Dx, wherein $M_i^+$ is one of the time-shift matrices applied to trace i in SP⁺ Dx, and wherein $R_i$ is the water surface reflectivity matrix applied to trace i in SP⁺ Dx.

8. The method of claim 7, wherein $M_i^-$ and $M_i^+$ are implemented in frequency domains and defined according to:

$$M_i^- = F^{-1} \cdot \Psi^- \cdot F,$$

$$\Psi^- = \begin{bmatrix} \exp(i\omega_1 \Delta t_-) & 0 & 0 \\ 0 & \ddots & 0 \\ 0 & 0 & \exp(i\omega_M \Delta t_-) \end{bmatrix},$$

$$M_i^+ = F^{-1} \cdot \Psi^+ \cdot F, \text{ and}$$

$$\Psi^+ = \begin{bmatrix} \exp(-i\omega_1 \Delta t_+) & 0 & 0 \\ 0 & \ddots & 0 \\ 0 & 0 & \exp(-i\omega_M \Delta t_+) \end{bmatrix},$$

wherein F is a Fourier transformation matrix, wherein $F^{-1}$ is an inverse of the Fourier transformation matrix, wherein $\psi^-$ and $\psi^+$ are corresponding time-shift matrices with shifted time being $\Delta t_-$ and $\Delta t_+$ for all available frequencies.

9. The method of claim 7, wherein R is defined according to:

$$R_i = \begin{bmatrix} r_i & 0 & 0 \\ 0 & \ddots & 0 \\ 0 & 0 & r_i \end{bmatrix},$$

wherein $r_i$ is a scalar.

10. The method of claim 1, wherein the adaptive target residue and the inversion target residue are relative data mismatch ratios that are pre-defined by users, and wherein the inversion target residue bears a value less than a minimum adaptive target residue.

11. One or more non-transitory computer-readable storage media coupled to one or more processors and having instructions stored thereon which, when executed by the one or more processors, cause the one or more processors to perform operations comprising:

receiving an offshore seismic dataset of a surveyed subsurface, the offshore seismic dataset including a seismic wavefield, wherein the offshore seismic dataset is collected by receivers that comprise a streamer, and wherein the streamer is deployed relative to a water surface;

determining an initial plane value for a reflectivity of the water surface and an initial location value for a position of the streamer;

generating a receiver deghosting model by backward and forward propagating the seismic wavefield at the water surface to streamer locations, the receiver deghosting model including tuning parameters;

adjusting the tuning parameters according to an adaptive target residue and an inversion target residue;

generating receiver deghosted output according to the receiver deghosting model; and determining a productivity of the surveyed subsurface based on the receiver deghosted output.

12. The one or more non-transitory computer-readable storage media of claim 11, wherein the tuning parameters include a water surface reflectivity matrix and two time-shift matrices.

13. The one or more non-transitory computer-readable storage media of claim 12, wherein the water surface reflectivity matrix takes scalar values to compensate for amplitude variations.

14. The one or more non-transitory computer-readable storage media of claim 12, wherein the time-shift matrices compensate for a spatial mismatch between a designed receiver profile and an actual streamer profile.

15. The one or more non-transitory computer-readable storage media of claim 11, wherein the adaptive target residue and the inversion target residue are relative data mismatch ratios that are pre-defined by users, and wherein the inversion target residue bears a value less than a minimum adaptive target residue.

16. A system, comprising:

a streamer comprising at least one receiver and deployed relative to a water surface;

one or more processors; and a computer-readable storage device coupled to the one or more processors and having instructions stored thereon which, when executed by the one or more processors, cause the one or more processors to perform operations comprising:

receiving an offshore seismic dataset of a surveyed subsurface, the offshore seismic dataset having been collected by the at least one receiver and including a seismic wavefield;

determining an initial plane value for a reflectivity of the water surface and an initial location value for a position of the streamer;

generating a receiver deghosting model by backward and forward propagating the seismic wavefield at the water surface to streamer locations, the receiver deghosting model including tuning parameters;

adjusting the tuning parameters according to an adaptive target residue and an inversion target residue;

generating receiver deghosted output according to the receiver deghosting model; and determining a productivity of the surveyed subsurface based on the receiver deghosted output.

17. The system of claim 16, wherein the receiver deghosting model simulates the seismic wavefield to minimize to facilitate an inversion process.

18. The system of claim 16, wherein the adaptive target residue and the inversion target residue are relative data mismatch ratios that are pre-defined by users, and wherein the inversion target residue bears a value less than a minimum adaptive target residue.

19. The system of claim 16, wherein the tuning parameters include a water surface reflectivity matrix and two time-shift matrices, wherein the water surface reflectivity matrix takes scalar values to compensate for amplitude variations, and wherein the time-shift matrices compensate for a spatial mismatch between a designed receiver profile and an actual streamer profile.

20. The system of claim 19, wherein the receiver deghosting model is defined according to:

$$\min_x \|A_{new} x - b\|_2 \text{ s.t. } F(x) < \tau,$$

with $$A_{new} = (M^- SP^- + RM^+ SP^+)D, \quad (3.2)$$

wherein $A_{new}$ is the receiver deghosting model, wherein x is a pre-defined constraint value, wherein $P^-$ is a backward one-way wavefield propagation matrix from the water surface to pre-defined dense target locations, wherein $P^+$ is a forward one-way wavefield propagation matrix from the water surface to the pre-defined dense target locations, wherein S is a sub-sampling matrix corresponding to a real, sparse data acquisition scheme in both an inline and a crossline direction, wherein x is a vector containing an encoded dense wavefield at the water surface, wherein D is a transformation matrix to build the dense wavefield from x, wherein b is a vector that includes measured data from the offshore seismic dataset, wherein $M^-$ is one of the time-shift matrices and applied to a backward propagated trace at a designed streamer location, wherein $M^+$ is one of the time-shift matrices and applied to a forward propagated trace at the designed streamer location, and wherein R is the water surface reflectivity matrix applied to the forward propagated trace at the designed streamer location.

* * * * *